US 6,970,333 B2

(12) United States Patent
Boeve

(10) Patent No.: US 6,970,333 B2
(45) Date of Patent: Nov. 29, 2005

(54) LAYER SYSTEM HAVING AN INCREASED MAGNETORESISTIVE EFFECT AND USE OF THE SAME, WHEREIN A FIRST LAYER OF AN ARTIFICIAL ANTIFERROMAGNET HAS A RELATIVELY LOW COBALT CONTENT

(75) Inventor: Hans Boeve, Valkenswaard (NL)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/486,561

(22) PCT Filed: Aug. 7, 2002

(86) PCT No.: PCT/DE02/02898

§ 371 (c)(1),
(2), (4) Date: Feb. 11, 2004

(87) PCT Pub. No.: WO03/017295

PCT Pub. Date: Feb. 27, 2003

(65) Prior Publication Data

US 2004/0233585 A1 Nov. 25, 2004

(30) Foreign Application Priority Data

Aug. 16, 2001 (DE) ............... 101 40 043

(51) Int. Cl.$^7$ ............................................. G11B 5/39
(52) U.S. Cl. ............................................. 360/324.11
(58) Field of Search ....................... 360/324.1–324.2

(56) References Cited

U.S. PATENT DOCUMENTS 6,313,973 B1 * 11/2001 Fuke et al. ............... 360/324.1

FOREIGN PATENT DOCUMENTS

WO   WO 94/15223   7/1994

OTHER PUBLICATIONS

Database Inspec Online! Institute of Electrical Engineers, Stevenage, GB; Jang S H et al.: "The analysis of spin valve with the spin flop by a thickness difference in the synthetic antiferromagnet" Database accession No. 7286495 XP002227439 abstract.

Dimopoulos T et al: "Enhanced Robustness and Tunnel Magnetoresistance in Artificial Ferrimagnet Based Tunnel Junctions" Journal of Applied Physics, American Institute of Physics, New York, US, vol. 87, No. 9, May 1, 2000, pp. 4685-4687, XP000947664 ISSN: 0021-8979 the whole document.

(Continued)

Primary Examiner—A. J. Heinz
(74) Attorney, Agent, or Firm—Young & Thompson

(57) ABSTRACT

The layer system having an increased magnetoresistive effect contains at least one soft magnetic detection layer, a non-magnetic decoupling layer, which rests on the detection layer, and a layer partial system, which is located at a distance due to the decoupling layer, forms an artificial antiferromagnet, and which is decoupled from the detection layer. This partial system comprises a first ferromagnetic and a second ferromagnetic layer. The first ferromagnetic layer should be antiferromagnetically coupled (K2) to the second ferromagnetic layer via a non-magnetic coupling layer. In addition, the side of the first ferromagnetic layer facing away from the coupling layer should be provided with an antiferromagnetic additional layer and be exchange-coupled (K3) thereto and, in addition, should have a material composition that differs from the second ferromagnetic layer.

13 Claims, 1 Drawing Sheet

OTHER PUBLICATIONS

Ounadjela K et al.: "Dependence of the Interlayer Exchange Coupling on the Constitution of the Magnetic Layers" Journal of Applied Physics, American Institute of Physics, New York, US. vol. 79, No. 8, Part 2A, Apr. 15, 1996, pp. 4528-4530, XP000695546 ISSN: 0021-8979 the whole document.

Database Inspec Online! Institute of Electrical Engineers, Stevanage, GB; Kl-Seok Moon et al: "MR characteristics of synthetic ferrimagnet based spin-valves with different pinning layer thickness ratios" Database accession No. 6883441 XP002227440 abstract & Intermag 2000 Digest of Technical Papers, 2000 IEEE International Magnetics Conference, Toronto, Ont., Canada, Apr. 9-13, 2000, vol. 36, No. 5, pt. 1, pp. 2857-2859, IEEE Transactions on Magnetics, Sep. 2000, IEEE, USA ISSN: 0018-9464.

Database Inspec Online! Institute of Electrical Engineers, Stevanage, GB; Colis S et al.: "Thermal stability of spin valve sensors using artificial Co/Ir based ferrimagnets" Database accession No. 7332969 XP002227441 abstract & MML01: 4th International Conference on Metallic Multilayers, Aachen, Germany, Jun. 24-29, 2001, vol. 240, No. 1-3, pp. 186-188, Journal of Magnetism and Magnetic Materials, Feb. 2002, Elsevier, Netherlands ISSN: 0304-8853.

K.Y.Kim et al.: "Interlayer coupling in spin valves with CoFe/Ru/CoFe/FeMn synthetic antiferromagnets" Journal of Applied Physics., vol. 89, No. 11, Jun. 1, 2001, pp. 7612-7615, XP001072883 American Institute of Physics, New York, US ISSN: 0021-8979 the whole document.

IEEE Trans. Magn. vol. 32, No. 5, Sep. 1996 , pp. 4624-4626.

IEEE Trans. Magn. vol. 34, No. 4, Jul. 1998, pp. 1336-1338.

Journ. Magn. Magn. Mat., vol. 165, 1997, pp. 524-528.

XMR-Technologien—Tecvhnologieanalyse: Magnetismus, Bd. 2, Physic. Technol. 1997, pp. 11-46.

* cited by examiner

LAYER SYSTEM HAVING AN INCREASED MAGNETORESISTIVE EFFECT AND USE OF THE SAME, WHEREIN A FIRST LAYER OF AN ARTIFICIAL ANTIFERROMAGNET HAS A RELATIVELY LOW COBALT CONTENT

CROSS REFERENCE TO RELATED APPLICATIONS

This is the 35 USC 371 national stage of international application PCT/DE02/02898 filed on 7 Aug. 2002, which designated the United States of America.

FIELD OF THE INVENTION

The invention relates to a layer system having an increased magnetoresistive effect, comprising at least one detection layer made from a soft-magnetic material, at least one decoupling layer which bears against the detection layer and is made from a nonmagnetic material, and at least one layer part-system which is spaced apart from the detection layer by the decoupling layer, forms an artificial antiferromagnet and is decoupled from the detection layer. This part-system includes at least one second ferromagnetic layer, which adjoins the decoupling layer, and at least one first ferromagnetic layer, which is antiferromagnetically coupled to the second ferromagnetic layer via a coupling layer made from nonmagnetic material and is provided, on its side facing away from the coupling layer, with an antiferromagnetic additional layer, to which it is exchange-coupled. The invention also relates to possible uses of a layer system of this type.

BACKGROUND OF THE INVENTION

The use of corresponding layer systems has been proposed in particular for measurement transducers, magneto couplers or current sensors. A layer system of this type includes, as an important constituent, a subsystem or part-system which forms what is known as an artificial antiferromagnet (AAF for short). An AAF part-system of this type is advantageous on account of a relatively high magnetic rigidity and a low coupling with respect to a magnetically softer detection or measurement layer through what is known as the orange peel effect and/or through macroscopic magnetostatic coupling fields.

The structure of corresponding AAF part-systems is fundamentally known (cf. WO 94/15223 A). This system generally comprises at least two ferromagnetic layers, which are antiferromagnetically coupled via a coupling layer made from nonmagnetic material. It may, for example, be formed from two magnetic Co layers and one antiferromagnetic coupling layer of Cu (cf. for example "IEEE Trans. Magn.", Vol. 32, No. 5, Sep. 1996, pages 4624 to 4626, or Vol. 34, No. 4, Jul. 1998, pages 1336 to 1338, or "Journ. Magn. Magn. Mat.", Vol. 165, 1997, pages 524 to 528).

To improve the magnetic rigidity of an AAF part-system of this type, that is to say its resistance to external outer magnetic fields, it is known to arrange an antiferromagnetic additional layer on that layer of the part-system which is remote from the detection layer, referred to below as a first ferromagnetic layer. By means of this antiferromagnetic additional layer, the (first) ferromagnetic layer, which is therefore directly adjacent, is additionally pinned in its magnetization on account of the presence of an exchange coupling, so that overall the AAF part-system becomes magnetically harder (known as exchange pinning or exchange biasing).

With a view to limiting the process costs involved in the production of corresponding layer systems and their AAF part-systems, it has hitherto always been assumed that the two ferromagnetic layers of the AAF part-system should consist of the same ferromagnetic material, for example of Co or a Co alloy. In some cases, different layer thicknesses have been planned for these two ferromagnetic layers, in order if appropriate to allow or improve orientation of the magnetization. It has been discovered that this restricts the magnetic matching of the AAF part-system to the remaining parts of the layer system.

SUMMARY OF THE INVENTION

Therefore, it is an object of the present invention to configure the layer system having the features described in the introduction in such a way that greater flexibility with regard to the matching of its AAF part-system becomes possible.

According to the invention, this object is achieved by the measures given in claim 1. The starting point for this is the discovery that this can only be achieved by the first ferromagnetic layer, which is provided with the antiferromagnetic additional layer and is exchange-coupled to it, having a different composition than the second ferromagnetic layer. Of course, the antiferromagnetic coupling between the two ferromagnetic layers must be maintained.

The advantages which are associated with the configuration of the layer system in accordance with the invention reside in an increase in the degree of freedom with regard to optimization of the AAF part-system. For example, in particular the following optimizations can be performed with regard to

- the indirect exchange coupling (what is known as the "RKKY" coupling) between the two ferromagnetic layers via the nonmagnetic coupling layer,
- the direct antiferromagnetic exchange coupling between the antiferromagnetic additional layer and the adjoining first ferromagnetic layer,
- the magnetic rotation properties (or the adjustability of the magnetization direction) of the first ferromagnetic layer, and
- what is known as the Néel coupling between the second ferromagnetic layer and the soft-magnetic detection layer which is decoupled therefrom.

Advantageous configurations of the layer system according to the invention are given in the dependent claims.

For reasons of the magnetization properties of the part-system, the first ferromagnetic layer may particularly advantageously be selected to be magnetically harder than the second ferromagnetic layer. This is because in a layer system according to the invention it is imperative for the uppermost ferromagnetic layer, which faces the decoupling layer, i.e. in this case the second ferromagnetic layer, given an initial magnetization (known as the "primary magnetization"), to have its magnetization reversed in an outer magnetic field, the process known as initialization. This process is implemented by means of a 180° switching operation, in which domain walls are often involved. These walls can then produce what are known as 360° walls in the switching ferromagnetic layer (=second ferromagnetic layer), which may have adverse effects on the magnetoresistive effect. It has been discovered that, if a magnetically softer material is used for the upper, second ferromagnetic layer, it is possible to avoid the formation of undesired 360° walls of this type. In particular, the number of 360° walls (or the proportion thereof by area) decreases as a result.

Accordingly, the second ferromagnetic layer can consist of a CoFe alloy with in relative terms a lower Co content than the first ferromagnetic layer, so that it becomes magnetically softer.

The abovementioned magnetization reversal of the second ferromagnetic layer of the layer part-system is also promoted by the first ferromagnetic layer having a greater thickness than the second ferromagnetic layer.

The material used for the antiferromagnetic additional layer is advantageously selected from the group consisting of NiO, FeMn, IrMn, NiMn, TbMn, CrPtMn, RhMn, PtMn and PdMn.

The coupling layer preferably consists of a material selected from the group of noble metals, in particular from the group consisting of Cu, Ag, Au, Pd and Ru.

The advantages of the configuration of the layer system in accordance with the invention come to bear in particular if it is designed as an XMR system.

The layer system according to the invention may particularly advantageously be used in a magnetic field sensor, such as for example a current sensor, or in a magneto coupler.

Further advantageous configurations of the layer system according to the invention will emerge from the claims which have not been discussed above.

BRIEF DESCRIPTION OF THE DRAWING

For further explanation of the invention, reference will now be made to the drawing, in which.

DETAILED DESCRIPTION OF THE INVENTION

Figure 1:
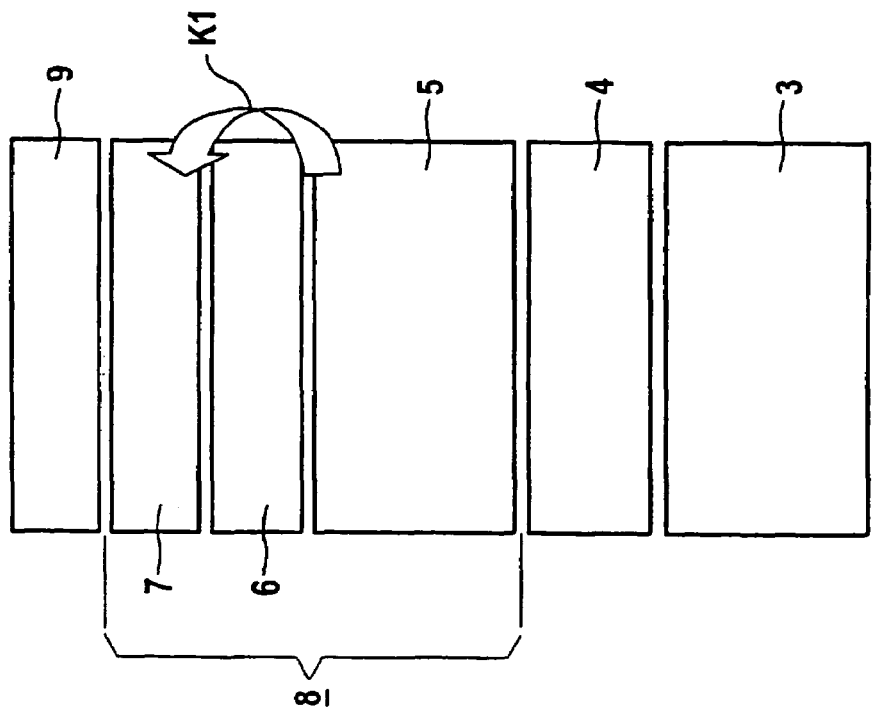
FIG. 1 diagrammatically depicts a layer system according to the invention.

The layer system 2 according to the invention, which is shown in section in FIG. 1, is based on known multilayer systems which have an increased magnetoresistive effect $\Delta R/R$. Accordingly, the magnetoresistive effect of this system is greater than that of known magnetoresistive single-layer systems with an anisotropic magnetoresistive effect ("AMR" effect) and in particular is over 2% at room temperature. The layer system is either giant-magnetoresistive ("GMR") or tunneling-magnetoresistive ("TMR") or colossal-magnetoresistive ("CMR") or has a giant magnetoimpedance or a giant AC resistance ("GMI"). The differences between corresponding layer systems are explained, for example, in the volume "XMR-Technologien"—Technologieanalyse: Magnetismus, Vol. 2—of the VDI Technology Center "Physi-kalische Technologien", Düsseldorf (DE) 1997, pages 11 to 46. In this context, the term "XMR technologies" is used as a collective term for the technical know-how based on the magnetoresistance effects AMR, GMR, TMR, CMR and GMI. The layer system according to the invention is preferably a GMR or TMR system, in which case it has what is known as a "spin valve" structure.

To build up the layer system 2 according to the invention, first of all a buffer layer or a buffer layer system 4, as a base for a layer part-system 5 to be deposited on, is provided on a substrate 3 in a manner which is known per se. This part-system should be a relatively hard-magnetic part-system, which is also known as a reference layer system. This part-system 5, which subsequently acts as an AAF layer part-system (cf. the above-referenced WO 94/15223 A), is spaced apart, on its (upper) side facing away from the substrate 3, from a soft-magnetic layer 7 or a corresponding layer system by means of an interlayer 6 made from a nonmagnetic material. In the case of a GMR layer system, this interlayer may be made from a metallic material, while in the case of a TMR layer system it consists of an insulating or semiconducting material. The soft-magnetic layer 7 is only weakly coupled to the in relative terms magnetically harder layer part-system 5 or is decoupled from this part-system. The interlayer 6 can therefore be considered as a decoupling layer. The figure indicates a possible orange peel coupling and magnetostatic coupling by means of a curved arrow K1. The layer 6 ensures that the soft-magnetic layer 7 can have virtually any desired orientation of its magnetization. It can therefore be used to perform the function of a detection layer or a measurement layer. Instead of a single detection layer of this type, it is also possible to provide layer systems with a corresponding action, such as for example systems comprising two ferromagnetic layers or a system comprising one ferromagnetic layer, one nonmagnetic layer and one ferromagnetic layer (known as a "synthetic free layer system").

As is intended to be indicated by a curly bracket in the figure, the structure of the subsystem 8 formed from the part-system 5, the at least one interlayer 6 located thereon and the at least one free magnetic layer 7 arranged thereon can be repeated periodically in a manner which is known per se (cf. the abovementioned WO 94/15223 A). In general, the layer system is also provided with a covering layer 9, which for reasons of protection is intended to protect the layers below from oxidation processes. For TMR and GMR applications, in which a current flows vertically through the layer stack, the covering layer must be electrically conductive, for example must consist of Au or Cr, since it then at the same time forms an upper electrode. For TMR applications, by way of example a lower electrode, for example in the form of a 30 nm thick Cu layer, is integrated in the buffer layer 4. The substrate 3 may be an Si wafer or another surface of another structure, which can fundamentally be any desired structure, for example a structure used in semiconductor technology. Of course, the sequence of the layers in the layer subsystem 8 with respect to the substrate 3 and its buffer layer 4 may also be reversed.

Figure 2:
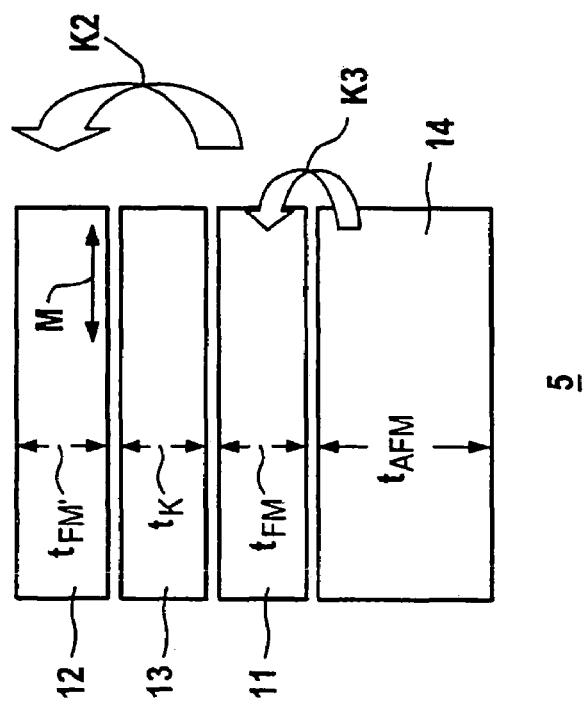
FIG. 2 shows a detailed view of an AAF part-system of this layer system shown in FIG. 1.

The reference layer part-system or AAF part-system 5 which is to be used for the layer system 2 according to the invention shown in FIG. 1 can be seen in more detail from the section illustrated in FIG. 2. The building blocks for this layer part-system 5 are at least one second layer 12, which faces the decoupling layer 6, has a thickness $t_{FM}'$ and is made from a ferromagnetic material of saturation magnetization $M_{FM}'$, and at least one first layer 11, which has a thickness $t_{FM}$ and is made from a ferromagnetic material of saturation magnetization $M_{FM}$. These two ferromagnetic layers 11 and 12 are to be antiferromagnetically coupled via a coupling layer 13 of thickness $t_K$ made from a nonmagnetic material, which is generally a noble metal, such as for example Cu. In the figure, this coupling is intended to be indicated by a curved arrow K2. In addition, an antiferromagnetic additional layer 14 of thickness $t_{AFM}$, which is exchange-coupled to the adjoining layer 11 in a manner known per se, is provided on that side of the first ferromagnetic layer 11 which faces away from the coupling layer 13. This exchange coupling is intended to be indicated in the figure by a curved arrow K3. In general, the thickness $t_{AFM}$ of the additional antiferromagnetic layer 14 is significantly greater than that of the first ferromagnetic layer 11 which adjoins it, and is typically less than 30 nm, preferably less than 10 nm.

According to the invention, the first ferromagnetic layer 11 should have a different material composition than the second ferromagnetic layer 12. In this context, a material composition is to be understood as meaning a different elemental metal or a metal alloy which differs in terms of the alloying partners and/or the proportions of the alloying partners. In addition, the thicknesses $t_{FM}$ and $t_{FM}'$ of the two ferromagnetic layers 11 and 12, respectively, may advantageously also differ, in which case the second ferromagnetic layer 12 preferably has a lower thickness $t_{FM}'$ than the first ferromagnetic layer 11 of thickness $t_{FM}$. The thickness $t_{FM}$ of the first ferromagnetic layer 11 and/or the thickness $t_{FM}'$ of the second ferromagnetic layer 12 are generally in each case less than 5 nm, while the thickness $t_K$ of the coupling layer 13 is preferably less than 3 nm.

Suitable materials for the ferromagnetic layers 11 and 12 are, in a known way, the three ferromagnetic elements Fe, Co or Ni or alloys which comprise or consist of these three elements. If appropriate, it is also possible for further elements, such as for example rare earths, to be added to the alloy. Therefore, by suitably selecting the alloying constituents, it is possible to deliberately set the magnetic properties of the two ferromagnetic layers 11 and 12. By way of example, a CoFe alloy with a Co content of over 60 atomic %, typically of 90 atomic %, can be used for the (second) layer 12, in order in this way to obtain an alloy which is known to be relatively magnetically soft, with a low magnetostriction. By contrast, a CoFe alloy with in relative terms a lower Co content than the second ferromagnetic layer 12 will then be selected for the (first) ferromagnetic layer 11, the Co content of the first ferromagnetic layer 11 preferably being less than 60 atomic %, for example approximately 50 atomic %. Alloys of this type are known to be considered relatively magnetically hard.

The nonmagnetic coupling layer 13 generally consists of one of the nonmagnetic metals which are known for this purpose, in particular of a noble metal, such as Cu, Ag, Au, Pd or Ru, while a material selected from the group consisting of NiO, FeMn, IrMn, NiMn, TbMn, CrPtMn, RhMn, PtMn, PdMn or $FePt_3$ is preferably selected for the antiferromagnetic additional layer 14.

An RKKY coupling between different alloys within the ferromagnetic materials system Ni—Fe—Co was tested experimentally. It is known from these tests that Co-rich alloys lead to the highest values for the coupling strength if Cu or Ru are selected as materials for the coupling layer 13. In this context, it has also been established that the coupling strength values are approximately equal, for example, for the alloys $Co_{90}Fe_{10}$ and $Co_{50}Fe_{50}$, whereas significantly lower values are observed for $Ni_{80}Fe_{20}$.

To estimate the coupling strength, first of all a simple AAF part-system without an exchange-coupled additional layer 14 will be considered. In this case, the RKKY coupling strength $J_{RKKY}$, based on a saturation magnetization $M_x$ and a layer thickness $t_x$ (with x in each case being equal to FM or FM') of the corresponding ferromagnetic layer, can be derived from the saturation field strength Hs using the following relationship:

$$J_{RKKY} = H_s \cdot (t_{FM} \cdot M_{FM} \cdot t_{FM}' \cdot M_{FM}')/(t_{FM} \cdot M_{FM} + t_{FM}' \cdot M_{FM}').$$

This coupling can readily be optimized by selecting the optimum combinations of materials for layers 11 to 13.

On the other hand, an exchange-coupled additional layer has to be taken into account in the layer system according to the invention. In this case, the coupling field $H_{Exch}$ of the ferromagnetic layer 12 with respect to the adjoining antiferromagnetic additional layer 14 is generally inversely proportional to the product of the thickness $t_{FM}$ and the saturation magnetization $M_{FM}$ of the ferromagnetic layer 11, so that the following relationship applies:

$$H_{Exch} = J_{Exch}/(t_{FM} \cdot M_{FM}),$$

where $J_{Exch}$ denotes the coupling energy.

For this reason, an increase in the coupling field can be observed if a change is made to ferromagnetic layers of reduced thickness or with a lower magnetic moment. Furthermore, it can be observed that a greater coupling field results for the alloy $Co_{50}Fe_{50}$ than for the in relative terms magnetically softer alloy $Co_{90}Fe_{10}$. Furthermore, magnetization curves for the double layer 14–11 (in this case with a ferromagnetic layer 11 made from $Co_{50}Fe_{50}$) reveal more abrupt switching or reorientation of the pinned additional layer 14. This can be recognized from the square-wave shape of the hysteresis loop and is particularly preferred in order to increase what is known as the magnetic window in angle sensor applications (=application area for the sensor in an external magnetic field). In this case, the magnetic window is determined from angle measurements, in which the reference layer (in this case the upper ferromagnetic layer 12) begins to rotate in the field direction, with the sensor signal being reduced by 5%. Consequently, an improvement in the square-wave form of the hysteresis loop leads to a correspondingly higher magnetic field window. For example, experiments carried out on the double layer system 14–11 comprising IrMn—$Co_{90}Fe_{10}$ reveal a more extensive, S-shaped hysteresis curve and consequently only allow use in a restricted window range.

The reorientation indicated by a double arrow M in FIG. 2 or a corresponding rotation of the magnetization in the upper second ferromagnetic layer 12 is critical in the case of what is known as an inverse AAF system, in which the direction of the net moment is determined by a thick lower (first) ferromagnetic layer 11. This concept is of interest for an exchange-coupled AAF system, as is required for the layer system according to the invention, since in this case the exchange coupling and the initial saturation of the AAF system can be induced simultaneously, specifically at a high temperature and in a strong magnetic field. In this case, the temperatures are above what is known as the blocking temperature of the antiferromagnetic material and above the saturation field $H_S$ of the AAF system. Furthermore, a corresponding inverse layer sequence can lead to a reduction and possibly elimination of a Néel coupling in the case of relatively large TMR sensors, where magnetostatic coupling at the edges is negligible, so that second-order effects in the ideal sinusoidal sensor characteristics are then correspondingly reduced.

In the case of a layer system with an inverse layer sequence, the upper ferromagnetic layer has to rotate through 180° in terms of its magnetization after initial magnetization of the AAF part-system. The success of a rotation process of this nature is decisively influenced by the magnetic properties of this layer. It can be improved by providing a layer comprising in relative terms a magnetically softer material and/or a layer having a predetermined uniaxial anisotropy. Very stable 360° domain walls can be formed in a thin layer of this type during the rotation process. These domain walls are formed in the event of local variations in the direction of the magnetocrystalline anisotropy between grains and are rather difficult to eliminate. They lead to a deterioration in the properties of the layer system, which can be recognized in particular from a reduced magnetoresistive effect. A further consequence is non-ideal switching properties of the free soft-magnetic detection layer, caused by a strong stray field which originates from the domain structure of an AAF system of this type. For this reason, magnetically softer alloys such as $Co_{90}Fe_{10}$ are a preferred choice, whereas $Co_{50}Fe_{50}$ alloys are less suitable. Of course, it is also possible for other alloys from the Ni—Co—Fe materials system to be selected on the basis of this aspect. Amorphous NiFeCo alloys, which have a lower saturation magnetization and in which a uniaxial anisotropy can be established relatively easily in particular with the aid of a longer heat treatment step, are also particularly suitable.

The above considerations demonstrate that it is particularly advantageous for the second ferromagnetic layer 12 to consist of a material which is in relative terms magnetically softer than the magnetic hardness of the first ferromagnetic layer 11.

A corresponding specific layer system 2 according to the invention having a structure or layer sequence as shown in FIGS. 1 and 2 therefore comprises, on a substrate 3, for example made from an Si wafer, the following successive layers:

a) a 3-layer system comprising Ta with a thickness of 5 nm, Cu with a thickness of 30 nm and Ru with a thickness of 5 nm, as buffer layer 4, b) an IrMn layer with a thickness of 8 nm as an antiferromagnetic additional layer 14, c) a $Co_{50}Fe_{50}$ layer with a thickness $t_{FM}$ of 2.5 nm as a first ferromagnetic layer 11, d) an Ru layer with a thickness $t_K$ of 0.8 nm as a nonmagnetic coupling layer 13, e) a $Co_{90}Fe_{10}$ layer with a thickness $t_{FM}'$ of 1.5 nm as a second ferromagnetic layer 12, f) in the case of a GMR layer system, a Cu layer with a thickness of 2.5 nm, and in the case of a TMR layer system an $AlO_x$ layer with a thickness of 1.5 nm, as a nonmagnetic decoupling layer 6, g) an $Ni_{80}Fe_{20}$ layer with a thickness of 6 nm or a $Co_{90}Fe_{10}/Ni_{80}Fe_{20}$ double layer with a thickness of 1 nm and 4 nm, respectively, for the corresponding materials, as a free soft-magnetic detection layer 7, and h) a covering layer 9 made from Ta with a thickness of 5 nm.

What is claimed is:

1. A layer system (2) having an increased magnetoresistive effect, comprising
   at least one detection layer (7) made from a soft-magnetic material,
   at least one decoupling layer (6) which bears against the detection layer (7) and is made from a nonmagnetic material, and
   at least one layer part-system (5) which is spaced apart from the detection layer (7) by the decoupling layer (6), forms an artificial antiferromagnet, is decoupled from the detection layer (7) and
   a) includes at least one second ferromagnetic layer (12), which adjoins the decoupling layer (6), and
   b) at least one first ferromagnetic layer (11), which
      b1) is antiferromagnetically coupled to the second ferromagnetic layer (12) via a coupling layer (13) made from nonmagnetic material,
      b2) is provided, on its side facing away from the coupling layer (13), with an antiferromagnetic additional layer (14), to which it is exchange-coupled,
      b3) has a material composition which differs from the second ferromagnetic layer (12)
      b4) is magnetically harder than the second ferromagnetic layer (12); the first ferromagnetic layer (11) consists of a CoFe alloy with in relative terms a lower Co content than the second ferromagnetic layer (12); and
   wherein the Co content of the first ferromagnetic layer (11) is less than 60 atomic %.

2. The layer system as claimed in claim 1, characterized in that the antiferromagnetic additional layer (14) is made from a material selected from the group consisting of NiO, FeMn, IrMn, NiMn, TbMn, CrPtMn, RhMn, PtMn, PdMn or $FePt_3$.

3. The layer system as claimed in claim 1, characterized in that the thickness ($t_{AFM}$) of the antiferromagnetic additional layer (14) is less than 10 nm.

4. The layer system as claimed in claim 1, characterized in that the first ferromagnetic layer (11) has a greater thickness ($t_{FM}$) than the second ferromagnetic layer (12).

5. The layer system as claimed in claim 1, characterized in that the thickness ($t_{FM}$) of the first ferromagnetic layer (11) and/or the thickness ($t_{FM}'$) of the second ferromagnetic layer (12) is/are in each case less than 5 nm.

6. The layer system as claimed in claim 1, characterized in that the antiferromagnetic additional layer (14) is made from a material selected from the group consisting of NiO, FeMn, IrMn, NiMn, TbMn, CrPtMn, RhMn, PtMn, PdMn or $FePt_3$.

7. The layer system as claimed in claim 1, characterized in that the thickness ($t_{AFM}$) of the antiferromagnetic additional layer (14) is less than 30 nm.

8. The layer system as claimed in claim 1, characterized in that the coupling layer (13) is made from a material selected from the group of noble metals, in particular from the group consisting of Cu, Ag, Au, Pd and Ru.

9. The layer system as claimed in claim 1, characterized in that the thickness ($t_K$) of the coupling layer (13) is less than 3 nm.

10. The layer system as claimed in claim 1, characterized in that the antiferromagnetic additional layer (14) is made from a material selected from the group consisting of NiO, FeMn, IrMn, NiMn, TbMn, CrPtMn, RhMn, PtMn, PdMn or $FePt_3$.

11. The use of the layer system as claimed in claim 1 in a magnetic field sensor or a magneto coupler.

12. The layer system as claimed in claim 1, characterized in that the first ferromagnetic layer (11) has a greater thickness ($t_{FM}$) than the second ferromagnetic layer (12).

13. The layer system as claimed in claim 1, characterized in that the first ferromagnetic layer (11) has a greater thickness ($t_{FM}$) than the second ferromagnetic layer (12).

* * * * *